United States Patent
Whitt (10) Patent No.: US 10,857,990 B2
(45) Date of Patent: Dec. 8, 2020

(54) HYDRAULIC SYSTEM BLEED DEVICE AND SYSTEM THEREOF

(71) Applicant: Robert Whitt, Cincinnati, OH (US)

(72) Inventor: Robert Whitt, Cincinnati, OH (US)

( * ) Notice: Subject to any disclaimer, the term of this patent is extended or adjusted under 35 U.S.C. 154(b) by 0 days.

(21) Appl. No.: 16/196,343

(22) Filed: Nov. 20, 2018

(65) Prior Publication Data
US 2020/0156615 A1    May 21, 2020

(51) Int. Cl.
*B60T 17/22*    (2006.01)
*B60R 25/00*    (2013.01)

(52) U.S. Cl.
CPC .......... *B60T 17/222* (2013.01); *B60R 25/005* (2013.01)

(58) Field of Classification Search
CPC ... B60T 17/222; B60T 17/223; B60R 25/005; B60R 25/022; B60R 25/0221; B60R 25/0225; B60R 25/08; B60R 25/083; B60R 25/086; B60R 25/007; B60R 25/008; E05B 79/16
USPC .................. 70/198–203, 237, 238, 254, 209; 188/352, 2 R, 112 R, 112 A, 3 R, 3 H, 188/353, 265; 254/DIG. 5, 93 VA, 423; 74/512, 513, 560, 481, 482, 532; 303/3, 303/7, 15, 16, 114.3
See application file for complete search history.

(56) References Cited

U.S. PATENT DOCUMENTS

| | | | | |
|---|---|---|---|---|
| 1,442,203 A * | 1/1923 | Williams | ............... | B60R 25/005 70/202 |
| 1,475,863 A * | 11/1923 | Pate | ..................... | B60R 25/005 70/199 |
| 1,519,534 A * | 12/1924 | Erickson | ............... | B60R 25/005 70/202 |
| 1,691,822 A * | 11/1928 | Lindmeyer | ............... | G05G 5/06 254/100 |
| 1,707,113 A * | 3/1929 | Christ | ................... | B60T 17/223 74/532 |
| 1,829,426 A * | 10/1931 | Welch | ........................ | G01L 5/28 73/132 |
| 1,907,835 A * | 5/1933 | Langbein | ............... | B60T 17/223 73/132 |
| 1,950,640 A * | 3/1934 | Wickliffe | .................. | B60S 5/00 254/93 R |
| 2,964,965 A * | 12/1960 | Hanson | .................. | B60K 23/00 74/481 |
| 3,866,719 A * | 2/1975 | Streutker | ................ | B60T 13/44 188/3 R |

(Continued)

FOREIGN PATENT DOCUMENTS

CA            2260628    *    2/1999

*Primary Examiner* — Lloyd A Gall
(74) *Attorney, Agent, or Firm* — The Iwashko Law Firm, PLLC; Lev Ivan Gabriel Iwashko (57) ABSTRACT

A hydraulic system bleed system for a vehicle, including a hydraulic system bleed device, including a pneumatic air cylinder containing air in an interior portion thereof, a ram rod disposed at least partially within the pneumatic air cylinder, such that the pneumatic air cylinder and the ram rod are disposed between a steering wheel and a brake pedal of the vehicle, and a recoil spring disposed within the interior portion of the pneumatic air cylinder to provide a springing reciprocating movement for the ram rod, and a mobile device to provide a signal to the hydraulic system bleed device to initiate the reciprocating movement such that the brake pedal is depressed.

7 Claims, 6 Drawing Sheets

(56) References Cited

U.S. PATENT DOCUMENTS

| | | | | |
|---|---|---|---|---|
| 4,825,671 | A * | 5/1989 | Wu | B60R 25/0221 |
| | | | | 70/202 |
| 5,031,729 | A * | 7/1991 | Wittkop | B60T 7/02 |
| | | | | 188/112 R |
| 5,299,668 | A * | 4/1994 | Youngers | B60T 17/223 |
| | | | | 188/352 |
| 6,044,671 | A * | 4/2000 | Haire | B60T 17/223 |
| | | | | 188/352 |
| 6,126,246 | A * | 10/2000 | Decker, Sr. | B60T 17/223 |
| | | | | 188/112 R |
| 6,131,712 | A * | 10/2000 | Rhodenizer | B60T 17/223 |
| | | | | 188/3 H |
| 6,634,466 | B1 * | 10/2003 | Brock | B60T 7/04 |
| | | | | 188/3 R |
| 6,845,851 | B1 * | 1/2005 | Donaldson | B60T 7/16 |
| | | | | 188/3 H |
| 6,874,602 | B2 * | 4/2005 | Greaves, Jr. | B60T 13/241 |
| | | | | 188/112 R |
| 8,720,861 | B2 * | 5/2014 | Lee | B60T 17/222 |
| | | | | 180/65.51 |
| 2001/0047915 | A1 * | 12/2001 | Takakubo | B60T 17/222 |
| | | | | 188/352 |
| 2006/0101818 | A1 * | 5/2006 | Black | B60T 17/222 |
| | | | | 60/584 |
| 2007/0012533 | A1 * | 1/2007 | Whitt | B60T 17/222 |
| | | | | 188/352 |
| 2007/0114836 | A1 * | 5/2007 | Kaminski | B60T 7/06 |
| | | | | 303/7 |
| 2012/0187358 | A1 * | 7/2012 | Lee | B60T 17/222 |
| | | | | 254/93 VA |
| 2013/0205882 | A1 * | 8/2013 | Neu | B60T 17/223 |
| | | | | 73/132 |
| 2013/0284015 | A1 * | 10/2013 | Menten | B60T 17/222 |
| | | | | 92/145 |
| 2014/0250995 | A1 * | 9/2014 | Vaeretti | B60T 17/223 |
| | | | | 73/132 |
| 2015/0336557 | A1 * | 11/2015 | McNeil, Sr. | B60T 17/223 |
| | | | | 254/104 |
| 2017/0129471 | A1 * | 5/2017 | Holmes | B60T 17/223 |
| 2018/0304879 | A1 * | 10/2018 | Holmes | B60T 17/223 |
| 2019/0135260 | A1 * | 5/2019 | Graves | B60T 17/223 |

\* cited by examiner

HYDRAULIC SYSTEM BLEED DEVICE AND SYSTEM THEREOF

BACKGROUND

1. Field

The present general inventive concept relates generally to tools used for bleeding a hydraulic system. Specifically, the present invention relates to a hydraulic system bleed tool and system thereof, which simplifies the bleeding process and allows for a single person to accomplish the bleeding process remotely.

2. Description of the Related Art

Hydraulic systems are commonly used in vehicles and other equipment in various applications such as brake systems, clutch systems, and auxiliary systems. Hydraulic systems work because the hydraulic fluid within these systems is non-compressible. However, maintenance on these systems typically requires that the hydraulic system be opened to the atmosphere such that air is introduced into the system. Because air is compressible, introduction of air into a hydraulic system comprises the operation of such hydraulic systems because pressure applied to the hydraulic fluid must first compress the air trapped in the system. Thus, at the conclusion of such maintenance activities, it is essential to the proper operation of such systems that all air be removed from the hydraulic system.

This process is generally known as "bleeding" the system, a process by which air is removed from the hydraulic system. This process is well known and is most frequently used in association with maintenance on braking systems on all manner of vehicles and equipment.

Presently, the simplest and most cost effective method of bleeding a brake system is to open bleed ports or fittings in the brake system and then apply pressure to the system by depressing the brake pedal. However, this generally requires the labor of two persons; one to depress the brake pedal, and the second to monitor the flow of brake fluid through the bleed ports. Because two persons are needed to perform this process, the labor costs associated with this type of maintenance are effectively doubled.

There are other systems that can provide the same bleeding function, but their method of doing can cause long-term damage to the parts.

Therefore, there is a need for a device that allows a single person to bleed a hydraulic system and thereby reduce the labor costs associated with this maintenance activity.

SUMMARY

The present general inventive concept provides a hydraulic system bleed device, and system thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a hydraulic system bleed system for a vehicle, including a hydraulic system bleed device, including a pneumatic air cylinder containing air in an interior portion thereof, a ram rod disposed at least partially within the pneumatic air cylinder, such that the pneumatic air cylinder and the ram rod are disposed between a steering wheel and a brake pedal of the vehicle, and a recoil spring disposed within the interior portion of the pneumatic air cylinder to provide a springing reciprocating movement for the ram rod, and a mobile device to provide a signal to the hydraulic system bleed device to initiate the reciprocating movement such that the brake pedal is depressed.

The hydraulic system bleed device may further include a control panel disposed on the exterior of the pneumatic air cylinder to receive the signal from the mobile device.

The hydraulic system bleed device may further include a steering wheel grip disposed at an end of the ram rod to be placed on an interior or exterior surface of a steering wheel of a vehicle to stabilize the hydraulic system bleed device.

The hydraulic system bleed device may further include a foot pedal grip disposed on an end of the pneumatic air cylinder, the foot pedal grip including a pedal contacting portion disposed on the end of the pneumatic air cylinder to contact a front surface of the brake pedal, and a clamping portion hingeably connected to the pedal contacting portion to detachably clamp the foot pedal grip to the brake pedal.

The foot pedal grip may include a foot pedal spring to apply a force against the front portion of the food pedal grip, such that the front portion of the foot pedal grip pivots inward into a closed position.

The hydraulic system bleed device may further include an air control system connected to the pneumatic air cylinder, including an air solenoid to generate airflow and direct air into the pneumatic air cylinder, an air chuck quick disconnect to seal air within the pneumatic air cylinder and prevent air leakage, an air pressure gauge to display current air pressure within the pneumatic air cylinder, and an air regulator to control airflow from the air solenoid within the pneumatic air cylinder.

The foregoing and/or other features and utilities of the present general inventive concept may also be achieved by providing a hydraulic system bleed device for a vehicle hydraulic system of a vehicle having a steering wheel and a brake pedal such that the vehicle hydraulic system communicates with a mobile device, the hydraulic system bleed device including a steering wheel grip disposed on at least one of an interior and an exterior of the steering wheel of the vehicle, a ram rod to extend away from a bottom surface of the steering wheel grip, a pneumatic air cylinder containing air in an interior portion thereof, the pneumatic air cylinder including therewithin at least a portion of the ram rod such that the steering wheel grip extends away from a first end of the pneumatic air cylinder via the ram rod, and a recoil spring disposed within the interior portion of the pneumatic air cylinder to provide a springing reciprocating movement for the ram rod in response to a signal received from the mobile device.

The hydraulic system bleed device may further include a control panel disposed on the exterior of the pneumatic air cylinder, the control panel including a switch to turn on or off the hydraulic system bleed device, a battery to provide power to the control panel, and a communication unit to communicate with the mobile device.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
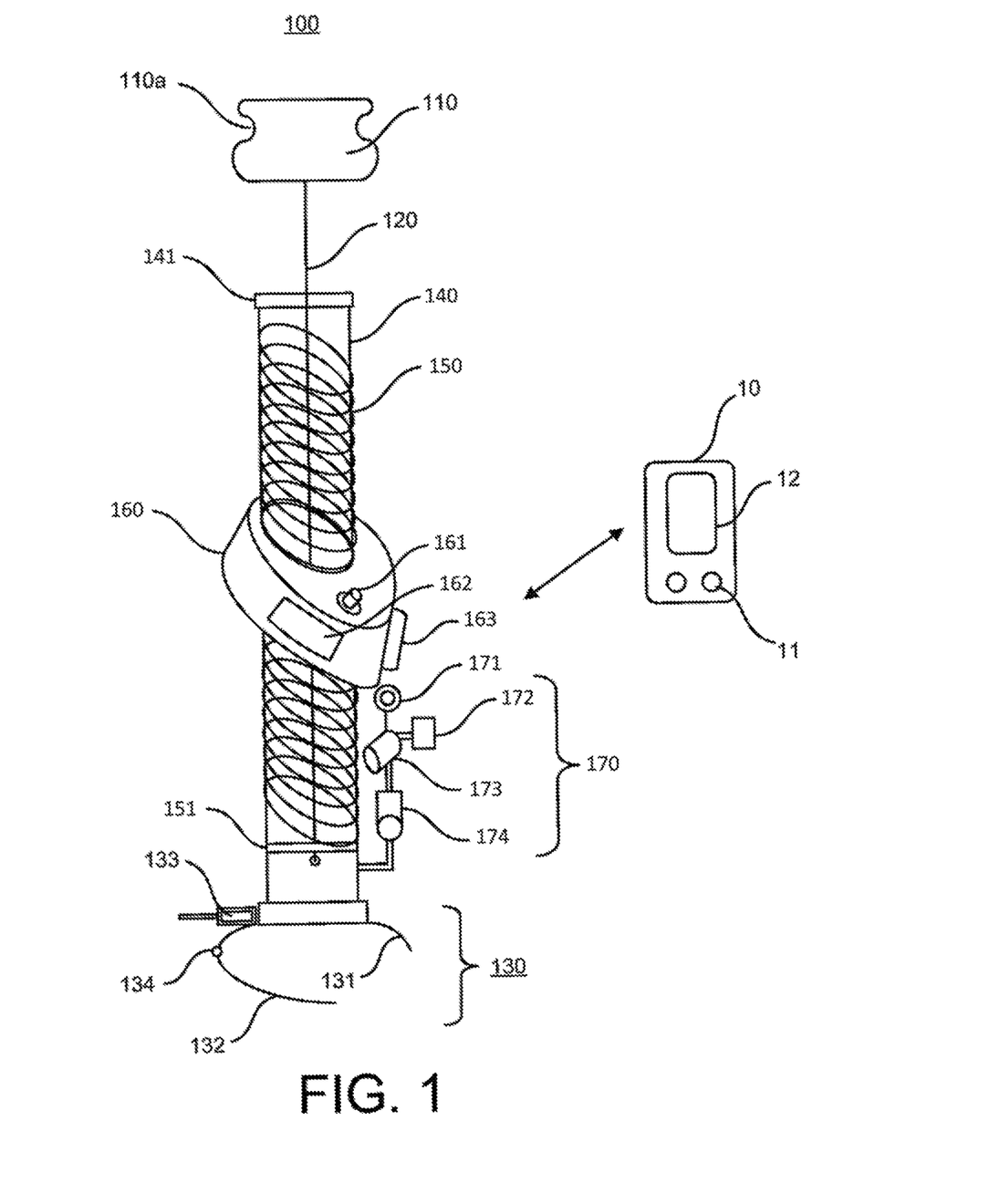
FIG. 1 illustrates a side cross-sectional view of a hydraulic system bleed device, according to an exemplary embodiment of the present general inventive concept.

FIG. 1 illustrates a side cross-sectional view of a hydraulic system bleed device 100, according to an exemplary embodiment of the present general inventive concept.

The hydraulic system bleed device 100 may include a steering wheel grip 110, a ram rod 120, a foot pedal grip 130, and a pneumatic air cylinder 140.

The steering wheel grip 110 may include a concave depression 110a disposed within a substantially center portion of the steering wheel grip 110. The concave depression 110a may operate via placement on an interior or exterior section of a steering wheel of a vehicle (not illustrated). Although the steering wheel grip 110 is illustrated in FIG. 1 to have a smooth, concave, curved surface, the steering wheel grip 110 may be jagged, angular, convex, but is not limited thereto. The steering wheel grip 110 may be of singular construction to form a clamp that allows ease of use and does not require assembly of multiple components to grip the steering wheel of the vehicle. The steering wheel grip 110 may be disposed substantially perpendicular with respect to the ram rod 120.

The ram rod 120 may be contained at least partially within a pneumatic air cylinder 140 and may extend the entire length of the pneumatic air cylinder 140. In other words, the ram rod 120 may be substantially parallel within the interior of the pneumatic air cylinder 140. A recoil spring 150 may be contained within pneumatic air cylinder 140 and may extend the entire length of the pneumatic air cylinder 140. The recoil spring may be unloaded (i.e., not compressed) and may be disposed between a top of the pneumatic air cylinder 141 and a spring stop 151. A spring stop 151 may be disposed substantially perpendicular on the end of the ram rod 120 within pneumatic air cylinder 140. The recoil spring 150 may surround the ram rod 120 within the interior of the pneumatic air cylinder 140 in a substantially coiled orientation. As such, the ram rod 120 may reciprocate up and down with respect to a lengthwise direction within the pneumatic air cylinder 140.

The pneumatic air cylinder 140 may be between 1 and 10 inches in diameter and between 4 and 50 inches in length, but is not limited thereto.

The foot pedal grip 130 may include a rear portion of the foot pedal grip 131, a front portion of the foot pedal grip 132, a foot pedal spring 133, and a foot pedal hinge 134, but is not limited thereto.

The foot pedal grip 130 may have the rear portion of the foot pedal grip 131 disposed substantially perpendicular to the opposing end of the pneumatic air cylinder 140 with respect to the steering wheel grip 110. The rear portion of the foot pedal grip 131 may be attached to the front portion of the foot pedal grip 132 via the foot pedal hinge 134, which allows the two portions to pivot. The foot pedal spring 133 is disposed on an end of the rear portion of the foot pedal grip 131 nearest to the foot pedal hinge 134. The foot pedal spring 133 may apply a force against the front portion of the foot pedal grip 132, such that the front portion of the foot pedal grip 132 may pivot inward and may be considered in a closed position. When a user places the hydraulic system bleed device 100 inside the vehicle, the user may pull on the front portion of the foot pedal grip 132 that may increase the distance between the rear portion of the foot pedal grip 131 and the front portion of the foot pedal grip 132, such that the front portion of the foot pedal grip 132 may pivot outward and may be considered in an open position. Therefore, the rear portion of the foot pedal grip 131 and the front portion of the foot pedal grip 132, collectively, create a clamp that allows ease of use and does not require assembly of multiple components to grip a brake pedal of the vehicle.

The hydraulic system bleed device 100 may communicate wirelessly with a mobile device 10, such that instructions may be sent between the hydraulic system bleed device 100 and the mobile device 10. The mobile device 10 may be a device having wireless communication capabilities, including, but not limited to, a cellular telephone, a laptop computer, a desktop computer, a tablet computer, a PDA, a smart watch, etc. Also, the mobile device 10 may have executed thereupon a program and/or application to facilitate communication between the mobile device 10 and the hydraulic system bleed device 100, and/or to control electronic portions of the hydraulic system bleed device 100 via the mobile device 10.

The mobile device 10 may include an input unit 11 and a display unit 12, but is not limited thereto. The display unit 12 may display an image of the hydraulic system bleed device 100, and the user may use the input unit 11 to turn on/off the hydraulic system bleed device 100 as displayed on the display unit 12, and/or selectively manipulate the hydraulic system bleed device 100 as displayed on the display unit 12 based on a preference of the user.

A control panel 160 may include a switch 161, a battery 162, and a receiver 163, but is not limited thereto.

The control panel 160 may be disposed on the exterior of pneumatic air cylinder 140. Although, the control panel 160 is illustrated in FIG. 1 as surrounding the exterior of the pneumatic air cylinder 140, the control panel 160 may have a different shape, such as rectangular prism, circular, conical, spherical, or any feasible shape as desired by a manufacturer, and may be disposed on the exterior of the pneumatic air cylinder 140. The control panel 160 may be powered with the battery 162. The battery 162 may be lithium-ion, nickel cadmium, nickel metal hydride, alkaline, etc., but is not limited thereto. The receiver 163 may provide wireless communication capabilities with the mobile device 10.

Referring to FIG. 1, the switch 161 may be activated to either turn on/off the hydraulic system bleed device 100, and/or selectively manipulate the hydraulic system bleed device 100 to load (compress) the recoil spring 150. The loading of the recoil spring 150 may provide a force against the foot pedal grip 130, while the spring stop 161 may pull the recoil spring 150 along the pneumatic air cylinder 140, which may pressurize a vehicle hydraulic system by applying pressure to the brake pedal with the foot pedal grip 130, while the steering wheel grip 110 may keep contact with the steering wheel of a vehicle (not illustrated).

An air control system 170 may include an air chuck quick disconnect 171, an air pressure gauge 172, an air regulator 173, and an air solenoid 174, but is not limited thereto.

Referring to FIG. 1, the air control system 170 may be disposed along a tube connected to the pneumatic air cylinder 140. After the switch 161 is activated or mobile device 10 is used to manipulate the control panel 160, air solenoid 174 may direct air through pneumatic air cylinder 140. The air filling the pneumatic air cylinder 140, may apply the pressure on the foot pedal grip 130, which applies pressure to the brake pedal of the vehicle (not illustrated). The air regulator 173 may control airflow while air pressure gauge 172 may provide a display of the current air pressure within the pneumatic air cylinder 140. The air chuck quick disconnect 171 may provide a seal for air and may prevent the leakage of air, but may also allow for a quick release of air by removing the air chuck quick disconnect 171.

Figure 2:
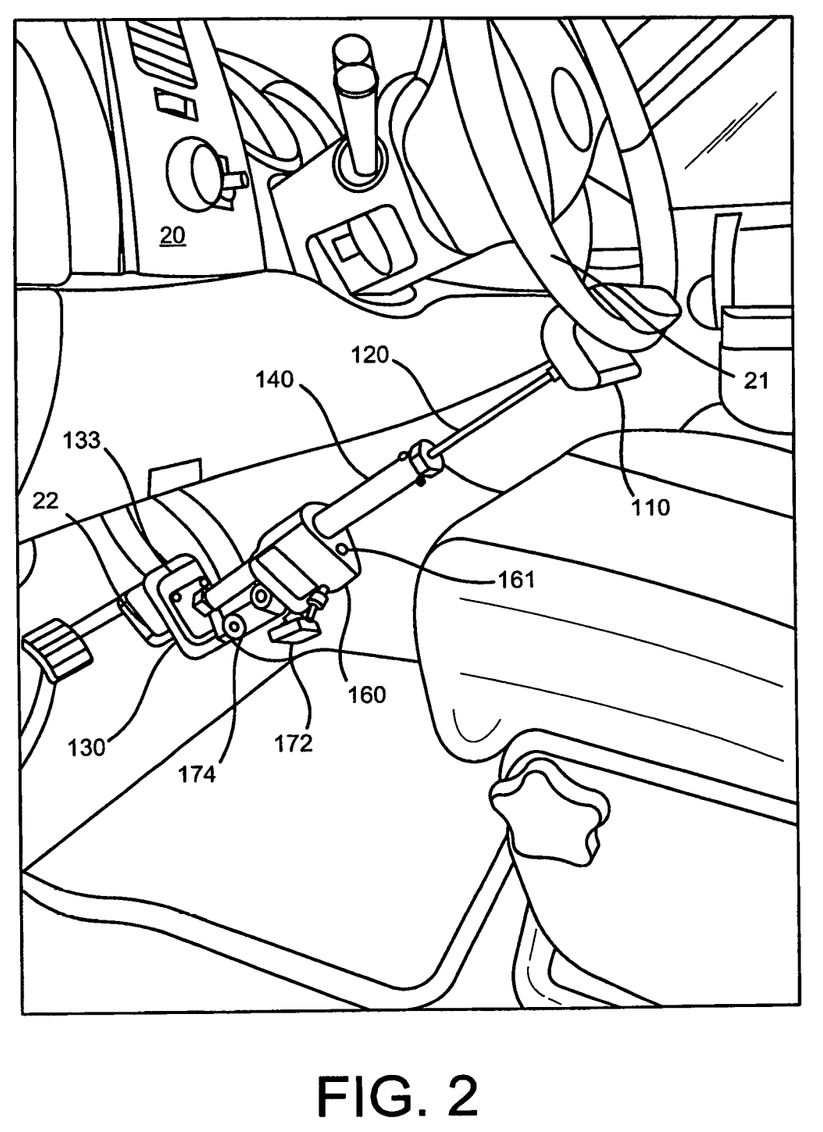
FIG. 2 illustrates a zoomed out view of the hydraulic system bleed device disposed within a vehicle, according to an exemplary embodiment of the present general inventive concept.

FIG. 2 illustrates a zoomed out view of the hydraulic system bleed device 100 disposed within a vehicle 20, according to an exemplary embodiment of the present general inventive concept.

Referring to FIG. 2, the hydraulic system bleed device 100 may be attached to an interior or exterior section of a steering wheel 21 of the vehicle 20 using the steering wheel grip 110. As such, the concave depression 110*a* may correspond to and contact at least one of interior or exterior section of the steering wheel 21 of the vehicle 20. The switch 161 on the control panel 160 may be activated such that the ram rod 120 may be extended away from pneumatic air cylinder 140. Accordingly, the foot pedal grip 130 may apply pressure to a brake pedal 22 of the vehicle 20, as a result of the extension of the ram rod 120.

Figure 3:
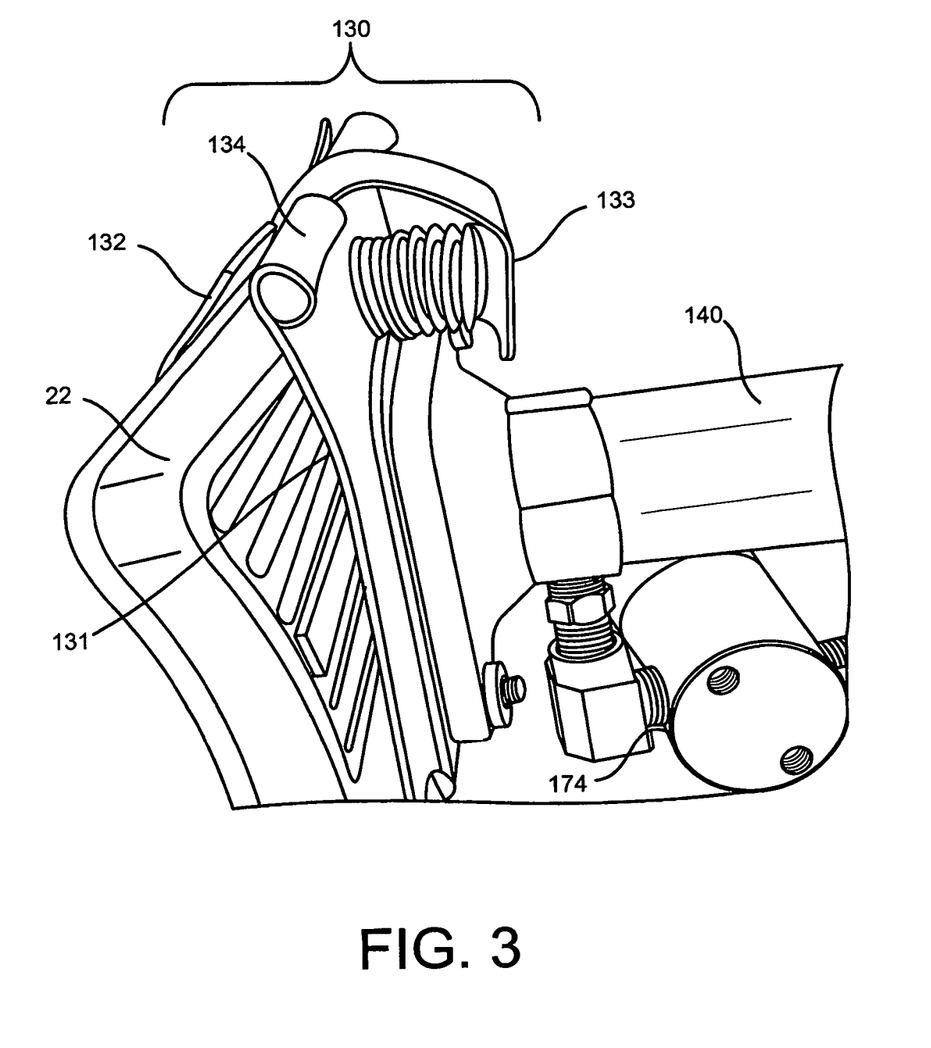
FIG. 3 illustrates a zoomed in view of a foot pedal grip of the hydraulic system bleed device attached to a brake pedal of the vehicle, according to an exemplary embodiment of the present general inventive concept.

FIG. 3 illustrates a zoomed in view of the foot pedal grip 130 of the hydraulic system bleed device 100 attached to the brake pedal 22 of the vehicle 20, according to an exemplary embodiment of the present general inventive concept.

Referring to FIG. 3, the foot pedal grip 130 may be attached to the brake pedal 22 of the vehicle 20. The rear portion of the foot pedal grip 131 may be disposed on the front surface of the brake pedal 22, while the front portion of the foot pedal grip 132 may be disposed on the rear surface of the brake pedal 22. The foot pedal spring 133 may apply a force against the front portion of the foot pedal grip 132, such that the front portion of the foot pedal grip 132 maintains a closed position with respect to the brake pedal 22.

Figure 4A:
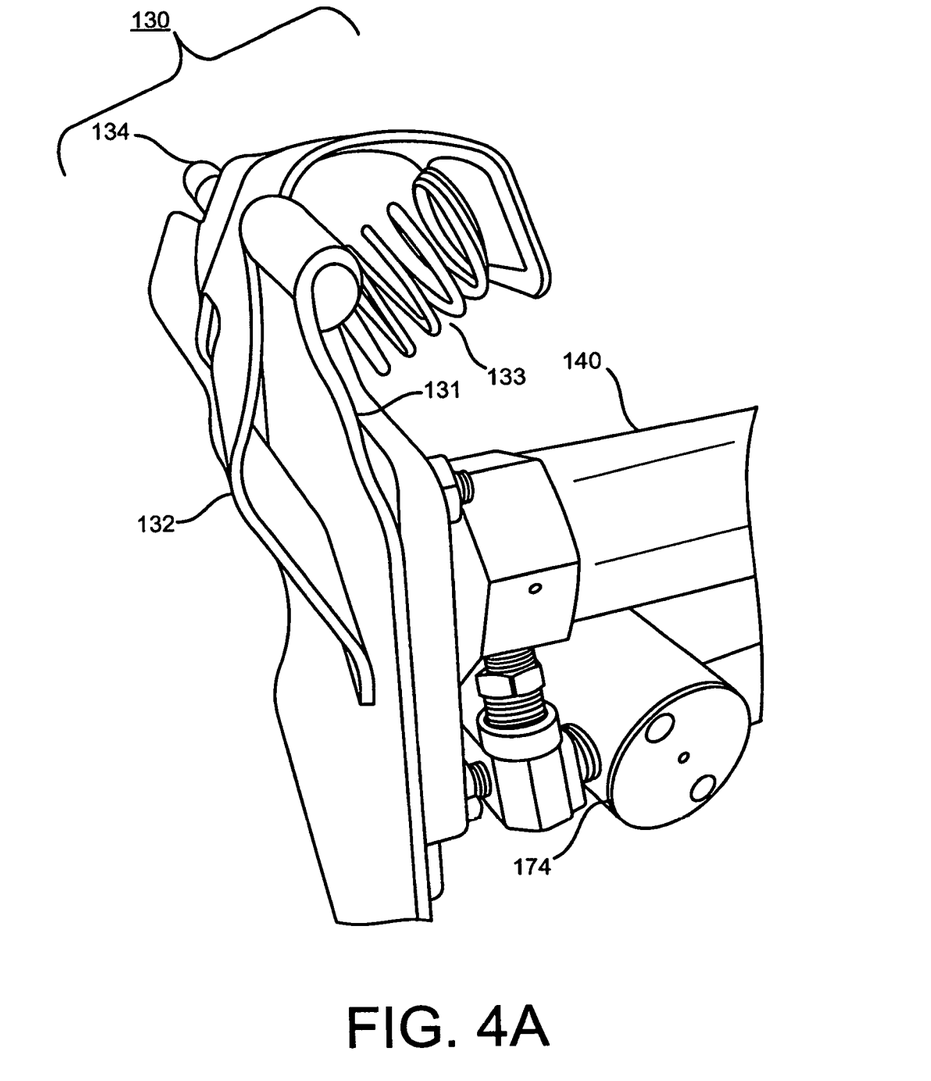
FIG. 4A illustrates another zoomed in view of the foot pedal grip of the hydraulic system bleed device, according to an exemplary embodiment of the present general inventive concept.

FIG. 4A illustrates another zoomed in view of the foot pedal grip 130 of the hydraulic system bleed device 100, according to an exemplary embodiment of the present general inventive concept.

Referring to FIG. 4A, the foot pedal grip 130 may maintain a closed position. The foot pedal spring 133 may apply a force against the front portion of the foot pedal grip 132, such that the front portion of the foot pedal grip 132 maintains a closed position. As such, the front portion of the foot pedal grip 132 may pivot inward toward the rear portion of the foot pedal grip 131 via the foot pedal hinge 134.

Figure 4B:
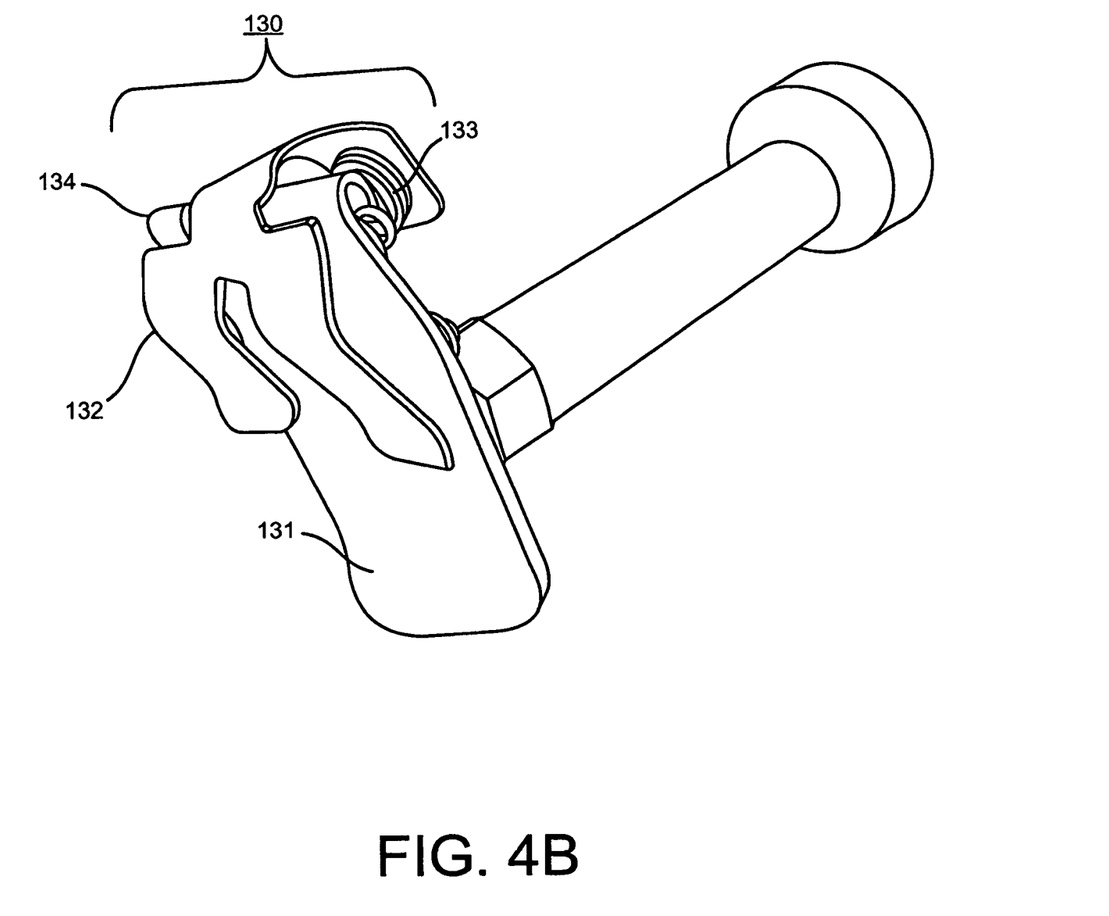
FIG. 4B illustrates another zoomed in view of the foot pedal grip of the hydraulic system bleed device, according to an exemplary embodiment of the present general inventive concept.

FIG. 4B illustrates another zoomed in view of the pedal grip 130 of the hydraulic system bleed device 100, according to an exemplary embodiment of the present general inventive concept.

Referring to FIG. 4B, the foot pedal grip 130 may maintain a closed position. The foot pedal spring 133 may apply a force against the front portion of the foot pedal grip 132, such that the front portion of the foot pedal grip 132 maintains a closed position. As such, the front portion of the foot pedal grip 132 may pivot inward toward the rear portion of the foot pedal grip 131 via the foot pedal hinge 134.

Figure 4C:
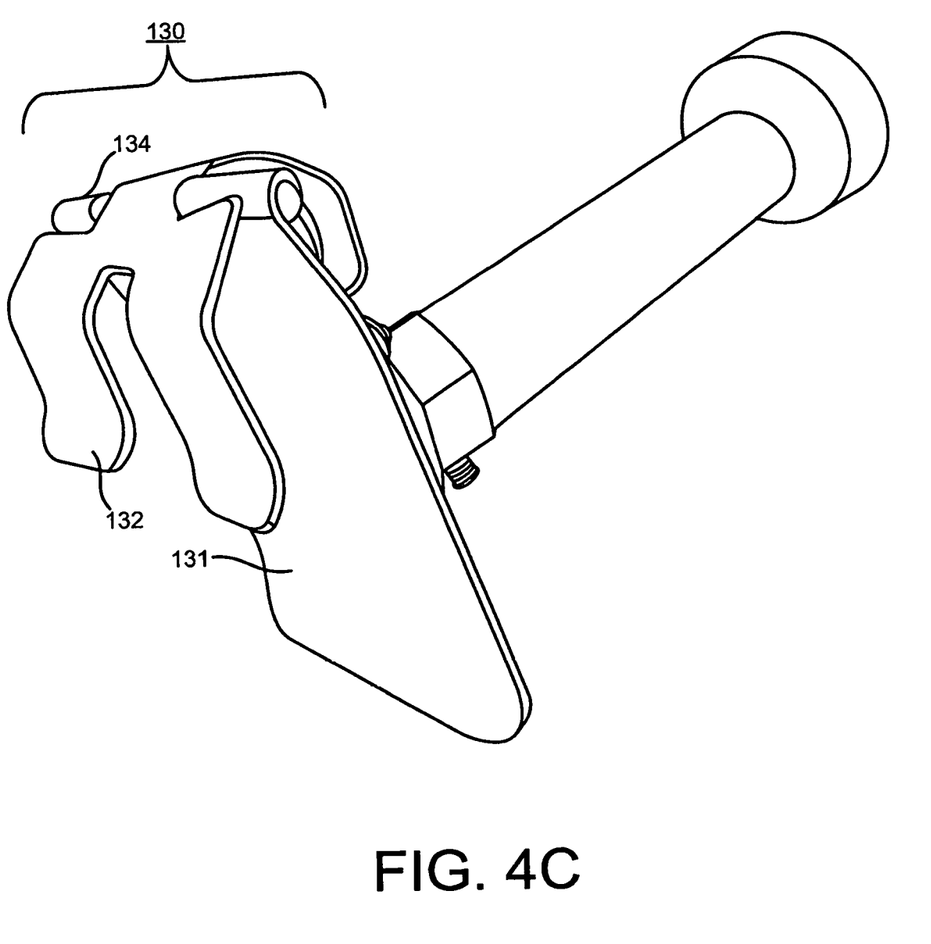
FIG. 4C illustrates another zoomed in view of the foot pedal grip of the hydraulic system bleed device, according to an exemplary embodiment of the present general inventive concept.

FIG. 4C illustrates another zoomed in view of the foot pedal grip 130 of the hydraulic system bleed device 100, according to an exemplary embodiment of the present general inventive concept.

Referring to FIG. 4C, the foot pedal grip 130 may maintain an open position. The user may pull on the front portion of the foot pedal grip 132 that may increase the distance between the rear portion of the foot pedal grip 131 and the front portion of the foot pedal grip 132, such that the front portion of the foot pedal grip 132 may pivot outward via the foot pedal hinge 134.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A hydraulic system bleed system for a vehicle, comprising:
　a hydraulic system bleed device, comprising:
　　a pneumatic air cylinder containing air in an interior portion thereof,
　　a ram rod disposed at least partially within the pneumatic air cylinder, such that the pneumatic air cylinder and the ram rod are disposed between a steering wheel and a brake pedal of the vehicle,
　　a recoil spring disposed within the interior portion of the pneumatic air cylinder to provide a springing reciprocating movement for the ram rod, such that the ram rod moves toward the pneumatic air cylinder in response to the recoil spring unloading, and moves away from the pneumatic air cylinder in response to the recoil spring loading, and
　　a steering wheel grip disposed at an end of the ram rod to be placed on an interior or exterior surface of a steering wheel of a vehicle to stabilize the hydraulic system bleed device, such that the steering wheel grip includes a concave depression disposed on a first side of the steering wheel grip and another concave depression disposed on a second side of the steering wheel grip; and
　a mobile device to provide a signal to the hydraulic system bleed device to initiate the springing reciprocating movement such that the brake pedal is depressed.

2. The hydraulic system bleed system of claim 1, wherein the hydraulic system bleed device further comprises:
　a control panel disposed on the exterior of the pneumatic air cylinder to receive the signal from the mobile device.

3. The hydraulic system bleed system of claim 1, wherein the hydraulic system bleed device further comprises:
　a foot pedal grip disposed on an end of the pneumatic air cylinder, the foot pedal grip comprising:
　　a pedal contacting portion disposed on the end of the pneumatic air cylinder to contact a front surface of the brake pedal, and
　　a clamping portion hingeably connected to the pedal contacting portion to detachably clamp the foot pedal grip to the brake pedal.

4. The hydraulic system bleed system of claim 3, wherein the foot pedal grip comprises:
　a foot pedal spring to apply a force against a front portion of the food pedal grip, such that the front portion of the foot pedal grip pivots inward into a closed position.

5. The hydraulic system bleed system of claim 1, wherein the hydraulic system bleed device further comprises:
　an air control system connected to the pneumatic air cylinder, comprising:
　　an air solenoid to generate airflow and direct air into the pneumatic air cylinder,
　　an air chuck quick disconnect to seal air within the pneumatic air cylinder and prevent air leakage,
　　an air pressure gauge to display current air pressure within the pneumatic air cylinder, and
　　an air regulator to control airflow from the air solenoid within the pneumatic air cylinder.

6. A hydraulic system bleed device for a vehicle hydraulic system of a vehicle having a steering wheel and a brake pedal such that the vehicle hydraulic system communicates with a mobile device, the hydraulic system bleed device comprising:
　a steering wheel grip disposed on at least one of an interior and an exterior of the steering wheel of the vehicle, such that the steering wheel grip includes a concave depression disposed on a first side of the steering wheel grip and another concave depression disposed on a second side of the steering wheel grip;
　a ram rod to extend away from a bottom surface of the steering wheel grip;
　a pneumatic air cylinder containing air in an interior portion thereof, the pneumatic air cylinder including therewithin at least a portion of the ram rod such that the steering wheel grip extends away from a first end of the pneumatic air cylinder via the ram rod; and
　a recoil spring disposed within the interior portion of the pneumatic air cylinder to provide a springing reciprocating movement for the ram rod in response to a signal received from the mobile device.

7. The hydraulic system bleed device of claim 6, further comprising:
　a control panel disposed on the exterior of the pneumatic air cylinder, the control panel comprising:
　　a switch to turn on or off the hydraulic system bleed device,
　　a battery to provide power to the control panel, and
　　a communication unit to communicate with the mobile device.

* * * * *